Figures 1, 2:
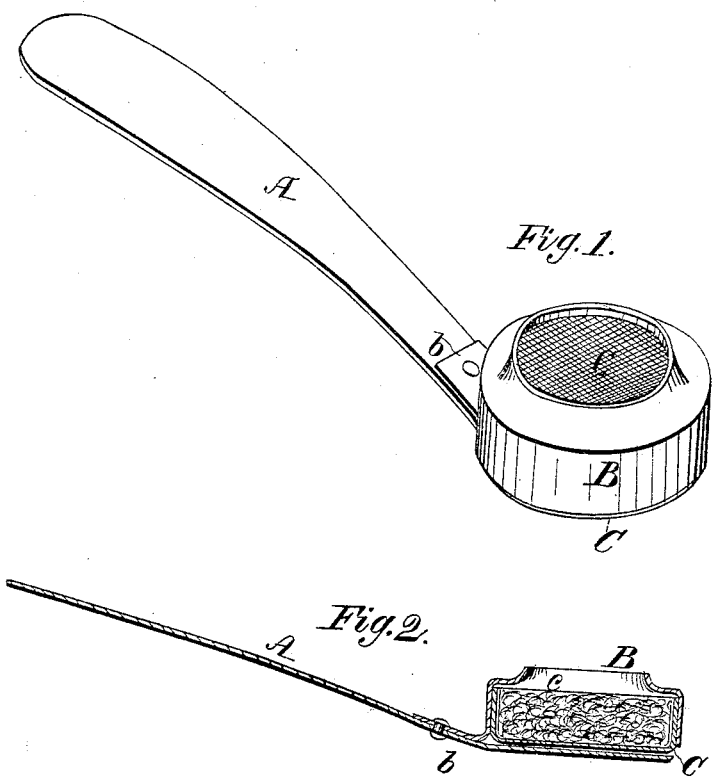

I. MORRIS.
Fire Kindler.

No. 83,988.  Patented Nov. 10, 1868.

ISSACHAR MORRIS, OF CLINTON, ILLINOIS.

Letters Patent No. 83,988, dated November 10, 1868.

IMPROVEMENT IN FIRE-KINDLERS.

The Schedule referred to in these Letters Patent and making part of the same.

*To all whom it may concern:*

Be it known that I, ISSACHAR MORRIS, of Clinton, in the county of De Witt, and in the State of Illinois, have invented a new and useful Improvement in Fire-Kindlers; and I do hereby declare that the following is a full, clear, and exact description thereof, reference being had to the accompanying drawings, which make part of this specification, and in which—

Figure 1 represents a view in perspective of my improved fire-kindler, and

Figure 2, a view in section of the same.

The object of my invention is to provide a device for kindling fires, which shall be of simple construction and ready application, and by the use of which a fire can be safely and quickly kindled, by means of a small quantity of inflammable liquid, and the dirt, smoke, &c., caused by the materials ordinarily used for this purpose, be obviated; to which end my improvements consist in pivoting a metallic bowl or burner to a suitable handle, near one end thereof, within which burner is placed a cup, or liquid-reservoir, removable therefrom at pleasure, and filled with pieces of pumice-stone, or other suitable porous substance, into which some inflammable liquid, as, for example, benzole, is poured, and ignited, for the purpose of kindling a fire when desired.

In the accompanying drawings, which show a convenient arrangement of parts for carrying out the objects of my invention, A represents the handle of the fire-kindler, and B, a bowl or burner, which is pivoted to the handle A, near one of its ends. The burner in this case is made in the form of a short sheet-metal cylinder, open entirely at its lower end, for the introduction and removal of the liquid-reservoir, and partly open at top, for the exit of flame.

C represents a metal cup, or liquid-reservoir, which fits neatly within the burner B, and is introduced therein by turning the burner upon the pivot b, which connects it to the handle, until the cup can be inserted into the lower end of the burner, which is then turned back to the position shown in the drawings, when the handle prevents the cup from dropping out. The cup, or liquid-reservoir, is entirely open at top, and filled with small pieces of pumice-stone, or other suitable porous substance, contained in and covered by a wire-gauze sack, c.

The burner B is made conical, or tapering towards its aperture, by which means an air-space is left between the wire-gauze sack and the mouth of the burner, which prevents the heat from affecting the sack, and imparts a draught to the flame, causing the liquid to burn much longer, and with better effect, than when there is no air-space above the sack.

To kindle a fire by my invention, a small quantity of benzole, or other inflammable liquid, is poured into the cup C, which diffuses itself among the pieces of pumice-stone therein. A small quantity of light wood beng placed under the coal in the stove, a match is applied to the opening in the top of the burner B, and the latter held close to the grate-bars or draught-door of the stove, when the liquid in the cup will burn with sufficient heat to quickly kindle the fire, the inconveniences attendant upon the use of the ordinary light combustibles being entirely obviated.

From the construction and arrangement of the burner and handle, it will be seen that the cup C can be readily removed, and replaced, for cleaning or replenishing.

The porous substance in the cup obviates the risk of explosion, and the wire gauze regulates and equalizes the flame burning upon its top.

Having thus fully described my invention,

What I claim therein as new, and desire to secure by Letters Patent, is—

The burner B, made conical, or tapering towards its orifice, for the purpose described, in combination with the cup C, sack c, containing pumice-stone, or other porous substances, and handle A, substantially as described.

In testimony that I claim the above-described improvements in fire-kindlers, I have hereunto signed my name, this 24th day of June, 1868.

ISSACHAR MORRIS.

Witnesses:
 C. A. POWERS,
 W. H. MCFARLAND.